United States Patent [19]
Still et al.

[11] Patent Number: 5,523,869
[45] Date of Patent: Jun. 4, 1996

[54] SYSTEM AND METHOD FOR LINE-CONDUCTED DIGITAL COMMUNICATION

[75] Inventors: Michael Still, Langenhagen; Ziaedin Chahabadi, Bad Munder, both of Germany

[73] Assignee: ke Kommunikations-Elektronik GmbH & Co., Hanover, Germany

[21] Appl. No.: 188,441

[22] Filed: Jan. 28, 1994

[30] Foreign Application Priority Data

Feb. 24, 1993 [DE] Germany .......................... 43 05 599.0
Dec. 20, 1993 [DE] Germany .......................... 43 43 456.8

[51] Int. Cl.$^6$ .......................... H04B 10/20; H04B 14/00
[52] U.S. Cl. .......................... 359/120; 359/118; 359/117; 359/113
[58] Field of Search .......................... 359/125, 137, 359/113, 115, 118, 120; 370/110.1

[56] References Cited

U.S. PATENT DOCUMENTS

| | | | |
|---|---|---|---|
| 5,136,411 | 8/1992 | Paik et al. ............................... | 359/125 |
| 5,189,673 | 2/1993 | Burton et al. .......................... | 370/110.1 |
| 5,202,780 | 4/1993 | Fussganger ............................. | 359/125 |

FOREIGN PATENT DOCUMENTS

| | | | |
|---|---|---|---|
| 2064492 | 2/1993 | Australia .............................. | 359/137 |
| 0421602 | 4/1991 | European Pat. Off. . | |
| 9109478 | 6/1991 | WIPO .................................... | 359/125 |

OTHER PUBLICATIONS

Hightower, "Economic FO system for new residential services", *Telephony*, Mar. 17, 1986, pp. 44–56.
Opal Project in Stuttgart with Optical Amplifiers NTZ Bd 45 (1992) pp. 11 & 12.
IEEE Communications Magazine, Spencer et al., Establishing Reliability and Availability Criteria Fiber-in-the-Loop Systems, Mar. 1991, pp. 84–90.
Globecom '89, Rowbotham et al., Plans For The Bishops Stortford (UK) Fibre to the Home Trials, Nov. 1989, pp. 1320–1325.
ANT Nachrichtentechnische Berichte, Feigel et al., FAST–ein Lichtwellenleiter–Pilotsystem für den Teilnehmeranschlussbereich, Apr. 1992, pp. 94–102.
Proceedings of the National Communications Forum, Burrage, Some Architectural Evolution Options for Fiber in the Loop, Sep. 1991, pp. 408–414.

*Primary Examiner*—Leo Boudreau
*Assistant Examiner*—Bhavesh Mehta

[57] ABSTRACT

A system is disclosed, which operates with active units for the line-conducted, digital transmission of communications between the exchange of a telecommunication network and subscribers connected thereto. At least one cross connector, operating with active electrical components, is connected to the exchange by a line containing at least one optical and/or electric transmission element. At least two distribution terminals, operating with active electrical components, are connected to the cross connector by a line containing at least one optical and/or electric transmission element. At least one subscriber is connected by an electrical line to the distribution terminals, which are always installed near a subscriber.

9 Claims, 2 Drawing Sheets

SYSTEM AND METHOD FOR LINE-CONDUCTED DIGITAL COMMUNICATION

BACKGROUND OF THE INVENTION

The present invention generally relates to a system and a method for line-conducted digital communication and, in particular, relates to one such system wherein the connection between the exchange of a telecommunication network and subscribers thereof includes an optical transmission line.

Conventional copper cables in telecommunication networks are being replaced in ever increasing measure by optical cables with waveguides, hereafter called "LWL". These replacements first started with the trunk network. The replacements thereafter expanded to the local exchange network. The declared goal of such replacements was the use of glass fibers as the transmission medium for optical signals in the subscriber station area, thus in the service line network, and to connect it as much as possible to every subscriber, i.e., the so called "fiber to the home". The glass fibers are designed to provide the subscribers with the high signal transmission rates that are possible with this transmission medium. The separate connection lines that were previously required for the different services can now be replaced by a single glass fiber connection. Today such services include, among others, telephone, telefax, telex, teletex, IDN and ISDN (basic and primary multiplex connections). The provision of such a service line network requires suitable devices, particularly for the subscribers, and cost-effective glass fiber transmission systems.

For example, one such known service line network is generally referred to as "Opal". In such a service line network, a select group of subscribers is connected by glass fibers, or LWL, to a local exchange. Glass fibers lead from the exchange to a passive optical distributor, from which the glass fibers extend to five subscribers and a cable branch. The passive service line network divides the light output according to the number of subscribers. Such a system inherently limits the number of subscribers that can be connected to the system. Further, appropriate lasers must be used for light wavelengths of 1330 nm or 1550 nm, for example. Because of the passive distributor, the range of the transmission and the transmission rates are severely limited.

Consequently, it is highly desirable to provide a telecommunication system that is not subject to such limitations.

SUMMARY OF THE INVENTION

Accordingly, one object of the present invention is to provide a telecommunication system that substantially overcomes the above-identified drawbacks of present systems.

This object is accomplished, at least in part, by a system that includes at least one cross connector operating with active electrical components connected to the exchange by a line containing at least one optical and/or electrical transmission element, at least two distribution terminals operating with active electrical components that are connected to the cross connector by a line containing at least one optical and/or electrical transmission element, and at least one subscriber unit connected by an electric line to the distribution terminals, that are installed in the vicinity of the subscribers.

The present system creates an active service line network (duplex star), in which the number of subscribers able to be serviced is virtually unlimited. If glass fibers are used between the exchange and the cross connector, and between the cross connector and the distribution terminals, no division of the light output takes place anywhere in the system. As a result, each subscriber receives a high transmission rate and output, independently of the other subscribers. Hence, the present system can service a large basic range and capacity. In addition, such a system offers the simple possibility of expansion, for the creation of an economical, hybrid network. It is therefore suited for both sparsely and heavily populated exchange areas. Further, the present system can also be used to expand existing networks.

For example, the distribution terminals can be installed in the building of one or more subscribers. From there, only short electric lines are needed to connect to the devices. In presently installed service line networks, this system can be implemented with existing means and without large expense. The present system can therefore be installed immediately, since no significant changes are required in the premises of the subscriber. This system is also quite reliable, since a malfunction of one subscriber does not affect any other subscribers. Data protection is ensured, because the channels can be precisely allocated to the individual subscribers.

With the present system, the advantages of glass fiber, with the possibility of broad-band transmission at high transmission rates, can be utilized to the greatest extent. In addition to the high transmission rates, the range of the transmission can also be significantly increased. The electrical lines leading from the distribution terminals to the subscribers are short enough so that each subscriber can be offered channels with a transmission rate of at least 2 Mbit/s. Such service provides each subscriber with the potential to quickly and simply utilize different or additional services. The corresponding connections can be provided by the network operator quite quickly through a management system.

For the normally longer path between exchange and cross connector, the system preferably operates with high-power laser diodes when glass fibers are used, so that problem-free transmission of the signals can be ensured for the respective range. The transmission between exchange and cross connector takes place at a transmission rate in the range of 100 Mbit/s, for example, preferably at 140 Mbit/s or 155 Mbit/s. However, lower and higher transmission rates are also possible. The transmission channels are distributed by the cross connector to the connected distribution terminals. Since only relatively short paths of about 2 km to 5 km must be bridged between the cross connector and the distribution terminals, optical transmitters can be used for the optical transmission therebetween, where the light output is not subject to too large a demand. The transmitters can be either light emitting diodes or laser diodes, such as those used in CD-playback equipment for example. These components are produced in large quantities are therefore relatively inexpensive. The transmission between cross connector and distribution terminals takes place at a transmission rate in the range of 10 Mbit/s, for example.

Typically, 40 channels of 64 kbit/s each, but at least 2 Mbit/s, are available at the subscriber premises, for example through electric lines from the distribution terminals. The transmission channels are distributed to the subscribers by channel allocators located in the cross connector and in the distribution terminals. Transmission channels can be made available to the subscribers after the system has been installed, and can be switched on in case of need.

In one preferred system configuration, interchange points, which are connected to the distribution terminals by electric lines, preferably by four-wire cables, are installed for subscribers. Bus lines extend from these interchange points, to which the subscribers can connect devices for different services. Further, only one adapter is required in each case, which makes the interface for the respective device available on the device side. The corresponding converters or units with such interfaces can then be omitted from the distribution terminal(s).

Preferably, a hybrid cable with at least one glass fiber and a pair of electric wires is connected between the cross connector and each distribution terminal. Such a hybrid pair of wires can supply the power for the distribution terminal and the subscriber from the central cross connector.

Other objects and advantages of the present invention will become apparent to those skilled in the art from the following detailed description read in conjunction with the appended claims and the drawings attached hereto.

BRIEF DESCRIPTION OF THE DRAWINGS

The drawings, not drawn to scale, include.

DETAILED DESCRIPTION OF THE INVENTION

Figure 1:
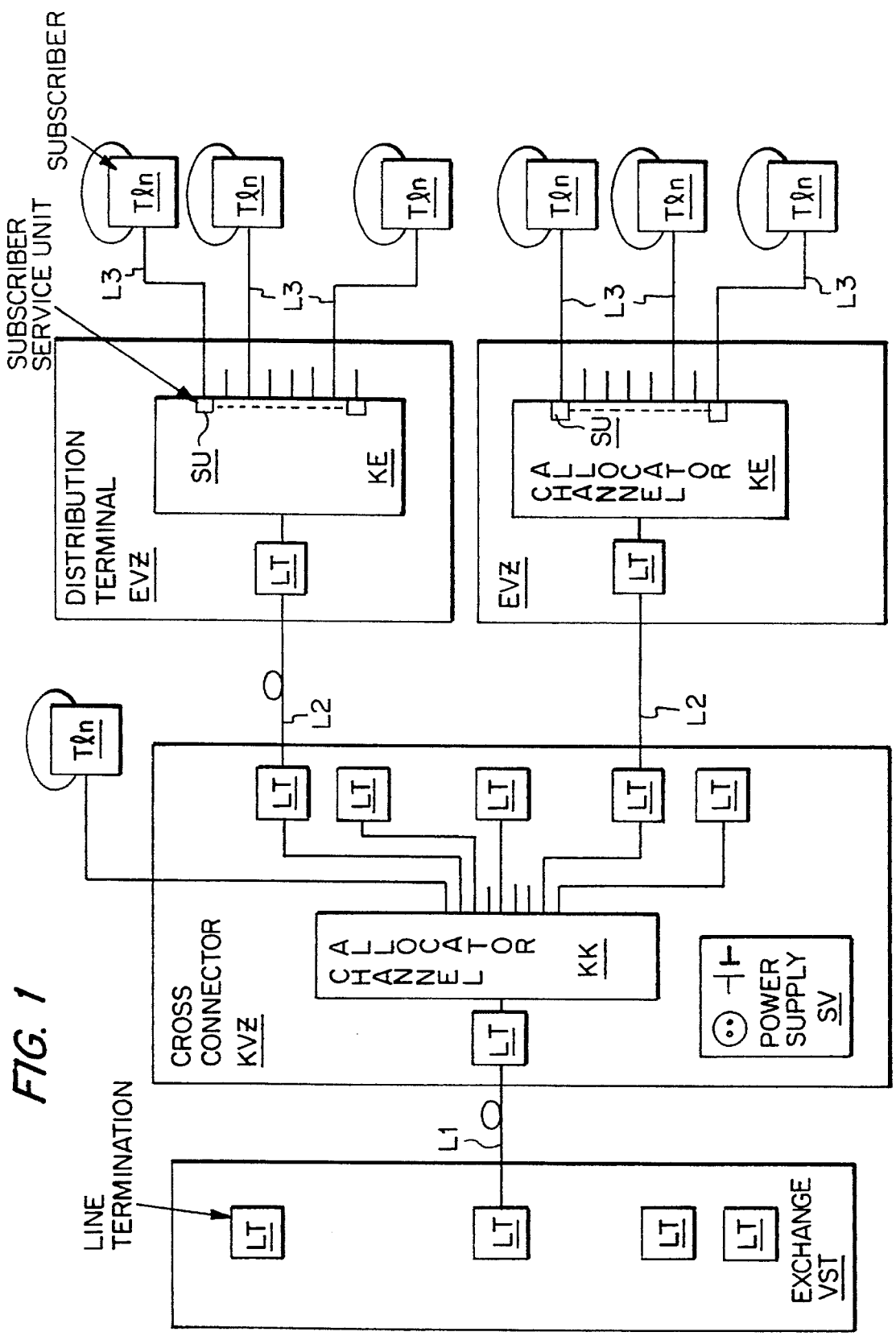
FIG. 1 which is a schematic block circuit diagram of a system embodying the principles of the present invention.

An exchange VST of a telecommunication network is connected to a cross connector KVZ by line communication L1, which contains optical and/or electrical transmission elements. For purposes of the following description, a communication line L1 with glass fibers is preferably used between the exchange VST and the cross connector KVZ. Measures for dividing the direction can be omitted if the communication line L1 contains two glass fibers. Both ends of the glass fibers in communication line L1 are connected to a line termination LT. The line termination LT includes, in addition to other components, electro/optical converters. For example, the line termination LT of the exchange VST preferably forms a 140 Mbit/s multiplex signal and converts it into an optical transmission line signal, the optical transmission line signal is then transmitted by communication line L1. The line termination LT in the cross connector KVZ performs the optical/electrical conversion of the 140 Mbit/s incoming signal and demultiplexes it. It will be understood that any number of cross connectors KVZ can be connected to the exchange VST.

The cross connector KVZ is preferably equipped with active, electrically operating components, and includes a channel allocator KK. In the preferred embodiment, the channel allocator KK includes at least two outlets for the connection of distribution terminals EVZ. In turn, the outlets of the channel allocator KK lead to the line terminations LT. The cross connector KVZ is connected to the distribution terminal EVZ by a second communication line L2. Preferably, the communication line L2 includes optical and/or electric transmission paths. Again, two glass fibers are preferred if the communication line L2 is only used to transmit optical signals. For a purely electrical signal transmission, the communication line L2 includes at least one pair of wires with copper conductors. In addition, the cross connector KVZ is provided with a power supply SV for the electrical components thereof. The available AC-network can be used as the power supply, with or without a battery buffer.

In the distribution terminal EVZ, the, glass fibers of communication lines L2 are connected to line terminations LT. As active distribution terminal(s) EVZ, the distribution terminals EVZ also include active, electrically operating components. Each distribution terminal EVZ includes a channel allocator KE, to which a number of subscribers Tln are connected. Each distribution terminal EVZ is installed in the vicinity of at least one, subscriber Tln. Electric lines, which can be kept short because of the nearby location, can then be used to connect to the subscriber Tln.

Each subscriber Tln is connected to a distribution terminal EVZ by at least one pair of electric wires. Preferably, two pairs of wires are used in each instance. The otherwise required measures for dividing the direction, e.g. echo compensation, can then again be omitted.

In the preferred configuration, both glass fibers and electric lines are used in the communication lines L2 between the cross connector KVZ and the distribution terminal EVZ. In such an embodiment, the communication lines L2 are hybrid lines. This particular embodiment offers the possibility of centrally supplying the electrical components of the distribution terminal EVZ and, insofar as required, the devices of the subscriber Tln, through the electric lines from the power supply SV of the cross connector KVZ. The occurs in all installations to analog telephone connections, as well as to the emergency operation of other devices. The power supply SV is also used when the communication lines L2 only contain electrical conductors, or when separate lines with glass fibers and electric conductors are used for the communications lines L2.

With the respective nearby location, the subscriber Tln can be directly connected to the channel allocator KK of the cross connector KVZ by means of an electric line. This is depicted for a subscriber Tln in FIG. 1.

The transmission of digital communication signals with the system shown in FIG. 1 preferably operates as follows, for example, the digital signals are transmitted through the glass fibers in communication line L1 at the highest possible transmission rate. The transmission rate is, e.g., in the range of 100 Mbit/s. Preferably transmission rates of 140 Mbit/s or 155 Mbit/s are used. In the line termination LT of the exchange VST and cross connector KVZ, high power laser diodes are preferably used as transmitters, with correspondingly high power receiving diodes. A single-mode fiber is used for the glass fiber of optical transmission line L1. The use of a single-mode fiber ensures that the signals can be transmitted without problems between the exchange VST and the cross connector KVZ, at the selected transmission rate. Further, the use of such an optical transmission line L1 allows transmission over long distances between the exchange VST and the respective cross connector(s) KVZ can be bridged without the use of additional or special (optical) amplifiers. As a result the number of exchanges VST in a network can be reduced.

The channels transmitted as optical signals between the exchange VST and the cross connector KVZ are distributed in the cross connector KVZ in accordance with the number and need of the connected distribution terminals EVZ. Hence, more cost-effective optical transmitters and receivers can be used in respective line terminations LT for the transmission of optical signals between the cross connector KVZ and the distribution terminals EVZ. For example, light emitting and laser diodes with a wavelength of about 780 nm are suitable as transmitters. For relatively short transmission paths of 2 km to 5 km between the cross connector KVZ and the distribution terminals EVZ, the use of such components ensures problem-free transmission of the signals at a transmission rate of 10 Mbit/s, for example. For longer transmission paths, high power components are again used between cross connector KVZ and the distribution terminals EVZ.

The subscribers Tln are connected by electric lines 13 to the distribution terminals EVZ, or their channel allocators KE. Since the distribution terminals EVZ are always installed in the vicinity of at least one subscriber Tln, it is ensured that the electric lines L3 are short enough so that the digital signals can be transmitted at the desired rate of about 2 Bit/s, without interference.

In the preferred configuration, each subscriber Tln who is connected to a distribution terminals EVZ has 40 channels of 64 kbit/s each at his disposal. This corresponds to a transmission ram of 2.56 Mbit/s, which a subscriber Tln could utilize to the maximum, if he wishes to make use of a corresponding number of offered services. This transmission rate is available to every subscriber Tln in a service unit SU located in the distribution terminal EVZ, to which subscribers Tln are connected. Each distribution terminal EVZ contains a service unit SU for every subscriber Tln. Through known addressing techniques, each service unit SU in the distribution terminal EVZ has access to the allocated time slots of a 2.56 Mbit/s data bus. The service unit SU converts these into respective interface signals on the subscriber side.

In one preferred embodiment, the distribution terminals EVZ are installed without service units SU, as a network termination only, for example an optical network termination, from which an electric line L4 leads to an interchange point P for individual or multiple subscribers in a building. The electric lines L4 preferably contain four (4) conductors. Such an embodiment of the system for the transmission of digital communications offers the advantage that the subscriber can be provided with a number of different, independent and sequential services through only two pairs of wires, without requiring other lines or jumper operations for newly added services.

Figure 2:
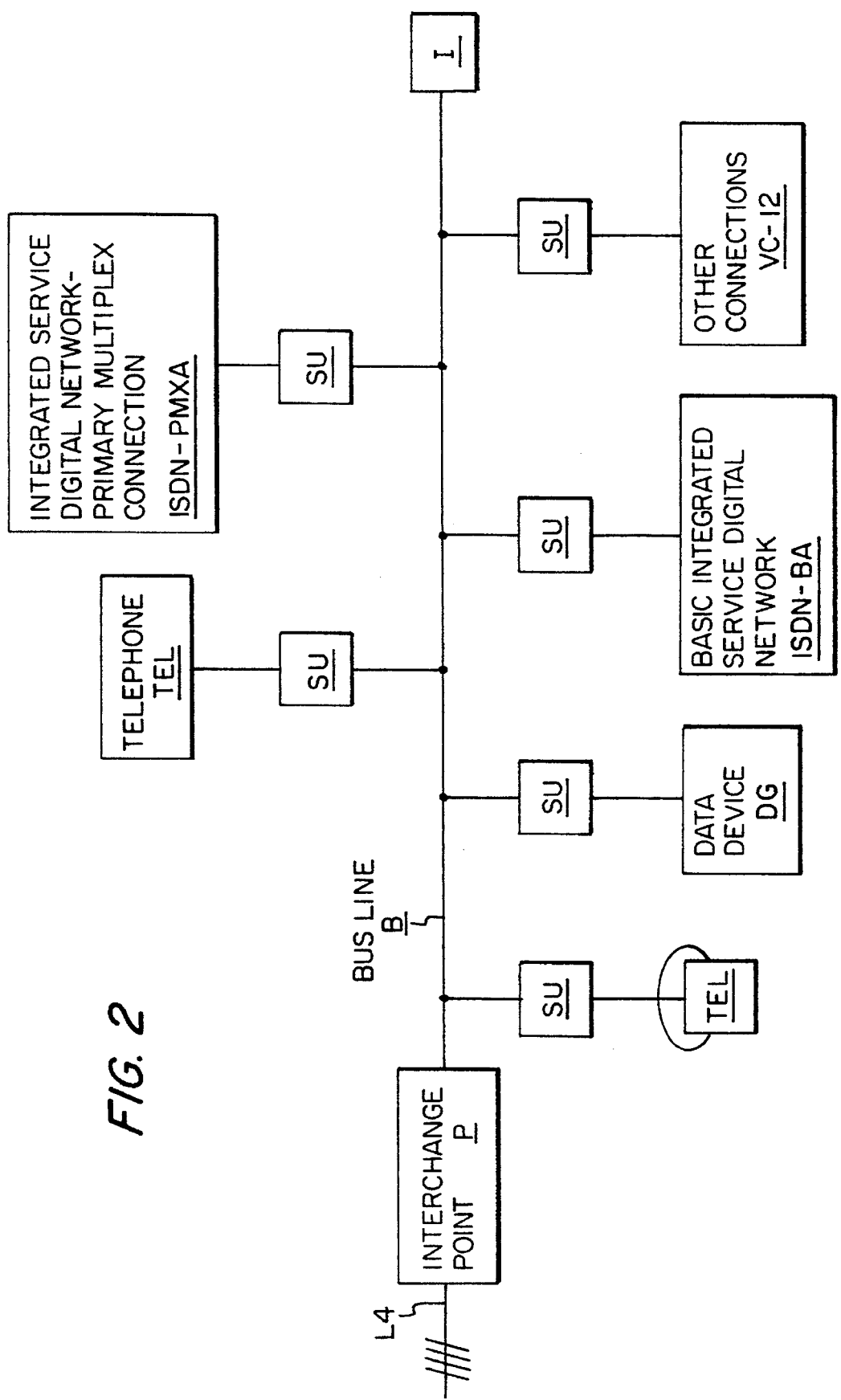
FIG. 2 which is a detailed block diagram of the system shown in FIG. 1.

Referring now to FIG. 2, a bus line B, hereafter called "bus", terminated at one end thereof by an impedance I, for example, extends between the interchange point P to a subscriber Tln. In such an embodiment, each subscriber Tln can connect devices for different services in parallel to each other to the bus B. To that end the subscriber Tln only needs an adapter, which, as a service unit, provides the required interface point. In such an embodiment, most of the subscribers Tln would typically only have a connection for an analog telephone TEL. The telephone TEL is connected to the bus B by a corresponding service unit (adapter), and is thereby connected to the exchange via interchange point P. A channel with a transmission rate of 64 kbit/s is sufficient for this connection. With a suitable service unit, other devices or terminals can be connected in parallel to the bus B. Such devices can include, for example, other telephones, data devices DG, basic ISDN connection ISDN-BA, primary ISDN multiplex connection ISDN-PMXA, and other connections VC12, as illustrated in FIG. 2. The transmission rates or channels required to operate these devices are basically available at the interchange point P. They only need to be switched on when needed.

This switching takes places through the channel allocators KK of the cross connector KVZ and the distribution terminal EVZ, to which the subscriber Tln or the interchange point P is connected, when a subscriber Tln wishes to attach an additional device or additional devices. The required control command can be transmitted by the exchange VST. To achieve this the subscriber Tln simply purchases a suitable adapter with the specific service unit for the device in desired, and connects it to the bus B at his premises. The additional channel or channels can then be switched on during the time needed by the subscriber, or another person.

In this fashion, with the corresponding devices, a subscriber Tln can utilize as many services as are allowed by the number of channels or the transmission rate available at the interchange point P. The fully utilizable transmission rate for all subscribers Tln connected to a distribution terminal EVZ is limited only by the transmission rate between the distribution terminal EVZ and the cross connector KVZ. Alternatively, instead of the channel allocator KK in the cross connector KVZ, a channel allocator KK could be present in the exchange VST. Channel allocators KK could also be installed in both the cross connector KVZ and in the exchange VST.

The system as shown in FIGS. 1 and 2 offers the advantage that testing of the transmission paths and the functions of all components is possible from the exchange VST, with a correspondingly designed and integrated digital channel. For the purpose of loop testing, the transmission paths can be interconnected at the interchange points P of the subscribers Tln.

For the sake of completeness it should be pointed out that the indicated transmission rates between the exchange VST and the cross connector KVZ on the one hand, and between the exchange VST and the distribution terminal EVZ on the other, only represent a typical order of magnitude. The transmission rates can be higher or lower, as needed. This also applies basically to the applicable transmission rate for all the subscribers Tln.

Although the present system has been described and discussed herein with respect to one or more specific embodiments it will be understood that other arrangements and configurations can also be implemented that do not depart from the spirit and scope hereof. Hence, the present invention is deemed limited only by the claims appended hereto and the reasonable interpretation thereof.

What is claimed is:

1. A system for line-conducted digital communication between an exchange of a teleconunumication network and subscribers connected thereto, said system comprising:

at least one cross connector having active components, said at least one cross connector being connected to said exchange by a first communication line, said cross connector having a channel allocator for selectively allocating service transmission channels to the subscribers and for providing combined subscriber service channel signals from said subscribers back to said exchange;

at least two distribution terminals having active components, said distribution terminals being connected to said at least one cross connector by a second communication line and each of said distribution terminals being installed near to said subscribers, wherein at least one of said first and second communications lines is an optical transmission line;

at least one subscriber unit, said subscriber unit being connected to one of said distribution terminals by an electrical transmission line at an interchange point, each of said at least one subscriber unit for connecting a respective subscriber service channel device;

a bus line connected to said interchange point, for connecting in parallel said at least one subscriber unit for providing in parallel a respective subscriber service channel device signal to said respective subscriber service channel device.

2. The system as claimed in claim 1 wherein said first communication line is an optical transmission line.

3. The system as claimed in claim 2 wherein said second communication line is an optical transmission line.

4. The system as claimed in claim 1 wherein said second communication line is an optical transmission line.

5. The system as claimed in claim 1, wherein said electrical transmission line is a four-wire line extending between said distribution terminal and said interchange point.

6. The system as claimed in claim 1, wherein said exchange further including a channel allocator, whereby the transmission channels are separately distributed to the subscribers, and are combined together when provided back to said exchange.

7. The system as claimed in claim 1, wherein said distribution terminal further includes a channel allocator, whereby the transmission channels are distributed to the subscribers, and are combined together when provided back to said exchange.

8. The system as claimed in claim 1; further including:

an electro/optical converter, said converter being connected at both ends of the communication lines containing optical transmission paths.

9. The system as claimed in claim 1; further including:

a power supply, said power supply being installed in said cross connector, said power supply providing power to said active components and at least to the telephones of said subscribers.

* * * * *